United States Patent [15] 3,671,674
Lutz [45] June 20, 1972

[54] CIRCUIT ARRANGEMENT FOR THE RECEPTION AND FORWARDING OF MESSAGE SIGNALS IN TIME DIVISION MULTIPLEX EXCHANGE STATIONS

[72] Inventor: Karl-Anton Lutz, Munich, Germany
[73] Assignee: Siemens Aktiengesellschaft, Berlin, Munich, Germany

[22] Filed: Sept. 14, 1970
[21] Appl. No.: 71,655

[30] Foreign Application Priority Data

Sept. 16, 1970 Germany ......................P 19 46 883.8

[52] U.S. Cl. ........................................179/15 AT, 179/15 BS
[51] Int. Cl. ........................................H04j 3/06
[58] Field of Search ...............179/15 AT, 15 BS; 178/69.5 R

[56] References Cited

UNITED STATES PATENTS 3,308,240 3/1967 Von Sanden......................179/15 AT

*Primary Examiner*—Ralph D. Blakeslee
*Attorney*—Birch, Swindler, McKie & Beckett

[57] ABSTRACT

A circuit arrangement for telecommunication exchange installations is described wherein connections are completed utilizing time multiplex techniques. In the described embodiment the message signals are PCM signals, and transmissions take place over four-wire networks. Delay is introduced into the connection elements between arriving and departing lines so that pulse frames of departing transmission lines have a time position different from the corresponding pulse frames for arriving lines. A common address store is provided for approaching coupling point switches over which a connection may be made to each given transmission line.

2 Claims, 1 Drawing Figure

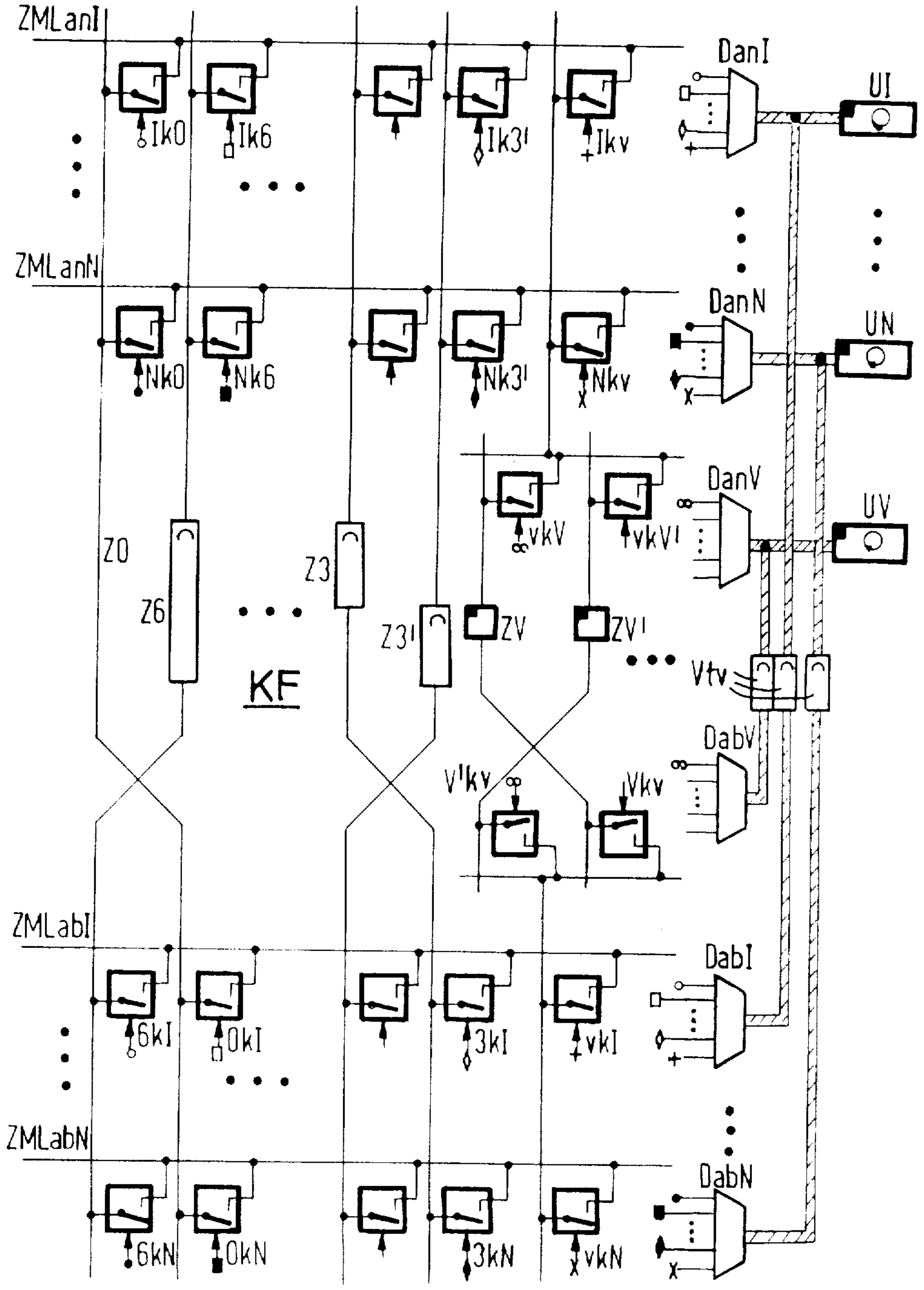
ZMLanI
ZMLanN
ZMLabI
ZMLabN
Ik0
Ik6
Ik3'
Ikv
Nk0
Nk6
Nk3'
Nkv
vkV
vkV'
ZV
ZV'
Z0
Z6
Z3
Z3'
KF
V'kv
Vkv
6kI
0kI
3kI
vkI
6kN
0kN
3kN
vkN
DanI
DanN
DanV
DabV
DabI
DabN
UI
UN
UV
Vtv

CIRCUIT ARRANGEMENT FOR THE RECEPTION AND FORWARDING OF MESSAGE SIGNALS IN TIME DIVISION MULTIPLEX EXCHANGE STATIONS

BACKGROUND OF THE INVENTION

In conventional telecommunication, in particular telephone, exchange installations the transmission of continuous analog signals takes place in spatially separated transmission channels. Newer telephone exchange installations do not use the space multiple principle, but rather they use the time division multiplex principle, whereby discontinuous analog signals are transmitted. Lately, in addition thereto, telephone exchange installations have gained considerable importance wherein a transmission of digital signals (which are also discontinuous) takes place; in this connection pulse code modulation (PCM) has reached special importance. In PCM transmissions, at periodically successive points in time, the instantaneous amplitude values of the voice signal are represented by binary words and the binary words are then transmitted. The principle task of a PCM time division multiplex exchange station then lies in completing a connection of the binary words appearing on the PCM receiving time multiplex lines leading to the exchange station, in time channels which are assigned on these lines to the individual connections, to selected PCM transmission time multiplex lines leading away from the exchange station. A four wire transmission line configuration is widely used in such systems for lines arriving at the exchange station and departing therefrom. Thus, in considering a given connection both transmission directions are to be considered separately.

In PCM telecommunication networks with a plurality of PCM time division multiplex exchange stations, the latter are generally operated synchronously with each other, i.e. at first with the same bit frequency and then, in connection with the later-mentioned frame equalization, also with a like phase position, of its pulse frame, or trunk pulse frame. This synchronization can be achieved by way of an autosynchronization through a so-called phase integration. For the transmission of the binary words over a four-wire operated PCM time division multiplex line connected with such an exchange station, customarily, in both transmission directions the same time channel within the pulse frame based on the trunk pulse frame of the exchange station on the transmission side in question is used, (see, for example, Proceedings IEE, Vol 111 (1964) No. 12, pp. 1976–1980). In addition thereto often a so-called isochronous or equal duration operation is provided within the individual PCM time division multiplex exchange stations. In this mode of operation the switching for completing the connection proceeds simultaneously in each case for both transmission directions. For this purpose, through the insertion of appropriately dimensioned travel time or delay elements into the individual PCM receiving time division multiplex lines leading to the individual PCM time division multiplex exchange stations, a so-called frame equalization is carried out. Thus, as seen from the exchange station in each case, the total travel time (forward and back travel time) on the PCM time division multiplex line in question proceeding between this exchange station and the adjacent exchange station in question, is supplemented to a whole multiple of the system scanning period with which, in the pulse code modulation, the amplitude tests are taken out. This arrangement permits the pulse frames of all PCM receiving time multiplex lines, leading to the exchange station in question to coincide with each other, as well as with the pulse frames of all PCM transmission time division multiplex lines leading away from this exchange station. Examples of this mode of operation may be found in: Bell System Technical Journal, Vol. XXXVIII (1959) No. 4, pp. 909–932, 922; Proceedings IEE, Vol. 111 (1964) No. 12, pp. 1976–1980, 1976; Proceedings IEE, Vol. 113 (1966) No. 9, pp. 1420–1428, 1421. In connection with the said frame equalization, suitably, an equalization of temperature-conditioned travel time fluctuations is carried out at the same time (see, for example, Proceedings IEE, Vol. 113, (1966) No. 9, pp. 1420–1428, 1421).

In connection with the switching of telecommunication connections conducted over PCM time division multiplex lines there occurs in principle, as already briefly indicated in the beginning, the problem that a time channel change has to be carried out, in order to take into account the different time channel seizures on the PCM time division multiplex line in question arriving at the exchange station and the PCM time division multiplex line in question departing from the exchange station. It is known in connection with an isochronous operation to provide in the connection switching matrix of the PCM time division multiplex exchange station, in the individual intermediate line pairs connecting the switching matrix inlets with the switching matrix outlets, differently dimensioned pairs of intermediate stores complimentary to each other in their storage time (referred to the system scanning period). The individual connections are in each case conducted over that intermediate line pair which contains the pair of intermediate stores required for the channel conversion in question (see Proceedings IEE, Vol. 111 (1964) No. 12, pp. 1976–1980, 1977). The intermediate stores, the storage time of which is partially fixed, partially variable, are hereby assigned to the individual connections for their duation. Considering such an isochronous operation, a copending U.S. Pat. application, Ser. No. 860,190, filed Sept. 23, 1969, suggests in the case of receiving and forwarding of PCM message signals connected with at least two transmission paths, conducting such message signals, in each case separately, in arriving and departing transmission directions. The pulse frames of all multiplex lines departing from the exchange station in each case are synchronized among one another, and the pulse frames of all lines arriving at the exchange station in question are synchronized among one another with the aid of delay links inserted into these lines. In the case of connection establishment, proceeding over such an exchange station, there is assigned in the pulse frame of the arriving line in each case a specific time channel, and for the pulse frame of the departing line, the next free time channel in each case is assigned. By this means, for the transmission of message signals over a transmission path connected with such an exchange station in both transmission directions, the same time channel within the pulse frame in each case is used. To proceed in such a manner of the delay links inserted into the lines arriving at the exchange station in each case are dimensioned in such a way that the pulse frames of the lines departing from the exchange station in each case possess a time position different as compared to the pulse frame of the lines arriving at the exchange station in question. This is due to the fact that the delay time for the delay links is fixed according to a desired mean total time distance between the time channels assigned in each case. This brings about a so-called quasi-isochronous operation having the desirable ability to be able to make do in the case where intermediate stores having low storage capacities are provided for a time channel conversion in the exchange station in each case.

SUMMARY OF THE INVENTION

The invention described herein shows a way to make cost savings in the circuitry needed in such a quasi-isochronous operations. The invention concerns a circuit arrangement for completing a connection of message signals, in particular PCM signals, in a time division multiplex telecommunication network exchange station connected with at least two transmission paths separately conducting message signals in arriving and departing transmission directions. In the establishment of a connection in such an exchange, there is assigned to the connection a specific time channel, in the pulse frame of the arriving line. The next free time channel is assigned to the departing line, whereby for the transmission of message signals over a transmission path connected with such an exchange station, in both transmission directions, in each case the same time channel within the pulse frame is used. The pulse frames of all lines departing from such an exchange station are synchronized among one another, and the pulse frames of all lines arriving at such an exchange station are synchronized among one another with the aid of delay links inserted into these lines. The delay links inserted into the lines arriving at the exchange station in each case are dimensioned in such a way that the pulse frames of the lines departing from the exchange station in each case possess a time position different from the pulse frames of the lines arriving at the exchange station in each case. This is due in each case to a delay time (pulse frame delay time) determined according to a desired mean total time distance between the time channels assigned in each case, according to the above-referenced U.S. application. According to this invention, such a circuit is characterized by the fact that in the connection switching matrix of such an exchange station, which possess differently dimensioned pairs of intermediate line pairs containing intermediate stores complementary in their storage time to one another, in each case only a common address store is provided for the approaching of these coupling point switches over which a receiving time division multiplex line is connectible to the individual intermediate line pairs. For the approaching of those coupling point switches over which the associated transmission time division multiplex line of the same transmission path is connectible to the individual intermediate line pairs, a first decoder is directly switched after this address circulation store in the known manner. The outlets of the decoder lead to the control inputs of those coupling point switches over which the receiving time division multiplex line in question is connectible with the individual intermediate line pairs.

On the output side, over a delay link, the delay time of which equals the pulse fram delay time, a second decoder is switched after the address circulation store. The outputs of this decoder lead to the control inputs of those coupling point switches over which the transmission time division multiplex line in question is connectible with the individual intermediate line pairs.

The invention has, as a result, the advantage of multiple utilization of the mentioned address circulation stores in that they are used in the stated manner for approaching of the coupling point switches at the input side of the switching matrix, as well as the coupling point switches at the output side of the switching matrix. Accordingly, a saving in the number of address circulation stores used as compared to the number needed in such a prior art switching matrix, results.

In a further development of the invention the common address circulation store and the decoders switched thereafter can also serve to approach coupling point switches over which the associated receiving time division multiplex line, or transmission time division multiplex line in each case is connectible to a further intermediate line. This line in turn is connectible with intermediate line pairs, containing pairs of static intermediate stores over first, or second further coupling point switches, for the approaching of which a common further address circulation store is provided. After the latter store, again on the output side, a first decoder is switched directly, and over a delay link of a delay time which is equal to the pulse frame delay time, a second decoder, the outputs of which lead to the control inputs of the said first, or second further coupling point switches. Such a development of the invention also brings about in advantageous manner a multiple utilization of an address circulation store, even in the approaching of those coupling point switches of the time division multiplex switching matrix which are needed for the above-mentioned assignment of intermediate stores with variable storage time.

BRIEF DESCRIPTION OF THE DRAWINGS

The principles of this invention may be best understood by reference to a description of a preferred embodiment given hereinbelow in conjunction with the drawing which is a schematic diagram of said preferred embodiment.

DETAILED DESCRIPTION OF THE DRAWING

The drawing shows schematically to an extent necessary for the understanding of the invention a PCM time division multiplex exchange station wherein four-wire operated time division multiplex lines are connectible with other four wire lines. Each line comprises a PCM receiving time division multiplex line ZMLanI, and a PCM transmission time division multiplex line ZMLabI. For example, with a time division multiplex line comprising, as shown in the drawing PCM receiving time division multiplex line ZMLanN and transmission time division multiplex line ZMLabN connections in each case of two time division multiplex lines, as for example, the two time division multiplex lines ZMLanI/ZMLabI and SMLanN/ZMLabN are brought about with the aid of intermediate line pairs Z0/Z6 . . . Z3/Z3'. Pairs of intermediate stores are inserted into the line pairs, and the storage times of these stores are complimentary. The individual intermediate lines Z0/Z6 . . . Z3/Z3' are connectible on the input side with the individual receiving time division multiplex lines ZMLanI . . . ZMLanN over coupling point switches Ik0, Ik6 . . . Ik3'; . . . Nk3'. Such a coupling point switch is, as will be explained in more detail latter, able to transmit, those periodically successive time compartments which are given through the time channel assigned to the connection in question on the receiving time division multiplex line in question within the pulse frame of this receiving time division multiplex line. On the output side the intermediate lines Z0/Z6 . . . Z3/Z3 are connectible with the transmission time division multiplex lines ZMLabI . . . ZMLabN over coupling point switches 6kI, 0kI . . . 3kI; . . . 6kN, . . . 0kN, . . . 3kN. Such a coupling point is able to transmit, in those periodically successive time compartments which are given through the time channel assigned to the connection in question on the transmission time division multiplex line in question, within the pulse frame of this transmission time division multiplex line. According to the four-wire operation of the time division multiplex line in each case a pair of intermediate lines is thereby included into such a connection, as is known.

To approach those coupling point switches lying at one and the same receiving time division multiplex line, and those coupling point switches lying at the associated transmission time division multiplex line, there is now provided, in each case, only one common address circulation store. Thus, there is provided for the approaching of coupling point switches Ik0, Ik6 . . . Ik3', over which the receiving time division multiplex line ZMLanI is connectible with the individual intermediate line pairs Z0/Z6 . . . Z3/Z3', and for the approaching of the coupling point switches 6kI, 0kI . . . 3kI, over which the transmission time division multiplex line ZMLabI is connectible with the individual intermediate line pairs Z0/Z6 . . . Z3/Z3', the common address circulation store UI. For the approaching of the coupling point switches Nk0, Nk6 . . . Nk3' lying at the receiving time division multiplex line ZMLanN, and of the coupling point switches 6kN, 0kN, . . . 3kN, lying at the transmission time division multiplex line ZMLabN, the common address circulation store UN is provided. In a manner already known in the time division multiplex communications art the addresses of those coupling point switches over which the receiving or transmission time division multiplex lines in each case, within the course of the individual connections conducted over the time division multiplex lines are connected with an intermediate line are recorded in the address store at a location corresponding to the time channel in each case. After each of the address circulation stores UI . . . UN, there is directly switched on the output side, also in a known manner a decoder DanI . . . DanN. The outputs thereof lead to the control inputs of those coupling point switches Ik0, Ik6 . . . Ik3'; Nk0, Nk6 . . . Nk3', over which the receiving time division multiplex line ZMLanI . . . ZMLanN in question is connectible with the individual line pairs Z0/Z6 . . . Z3/Z3'. In the drawing this is illustrated by appropriate marks at the outputs of the decoders and at the control inputs of the coupling point switches in question. In addition after each of the address circulation stores UI . . . UN, there is switched, over a delay link Vtv, a second decoder DabI . . . DabN. The delay time of the delay link Vtv equals the pulse frame delay time *tv* by which the pulse frames of the transmission time division multiplex lines PMLabI . . . ZMLabN are displaced in time from the pulse frames of the receiving time division multiplex lines ZMLanI . . . ZMLanN. This is more fully described in the above referenced US application. The outputs of the second decoders DabI . . . DabN lead, as is again shown in the drawing by appropriate markings, to the control inputs of those coupling point switches 6kI, 0kI . . . 3kI; . . . 6kN, 0kN . . . 3kN, over which the transmission time division multiplex line ZMLabI . . . ZMLabN in question is connectible with the individual intermediate line pairs Z0/Z6 . . . Z3/Z3'.

According to the coupling point addresses of the switches utilized in the connection of matrix KF, momentarily stored in the address circulation stores UI . . . UN, of the coupling point switches, the coupling point switches in question are in each case pulsed closed periodically, according to time channel. It shall be assumed that in the one transmission direction a connection arriving over the receiving time division multiplex line ZMLanI, is to be forwarded over the transmission time division multiplex line ZMLabN, and, for example, a time channel shall be assigned to the connection on the transmission time division multiplex line ZMLabN which coincides in time with the time channel assigned to the connection on the receiving time division multiplex line ZMLanI. The address of the coupling point switch Ik0 is recorded, at that circulation phase which corresponds to the time channel assigned to the connection in question on the receiving time division multiplex line ZMLanI, into circulation store UI, so that coupling point switch Ik0 is now pulse-actuated, periodically, according to the correct time channel. The information transmitted in this time channel on the receiving time division multiplex line ZMLanI, is in each case forwarded on to the intermediate line Z0 of the intermediate line pair Z0/Z6. In order to further transmit this information to transmission time division multiplex line ZMLabN, upon the actuation of coupling point switch Ik0, coupling point switch 0kN must be simultaneously actuated. The address thereof is then recorded into the address circulation store UN, at a circulation phase which precedes the previously mentioned circulation phase with which the address of the coupling point switch Ik0 is recorded in address circulation store UI. The time period between the two circulation phases corresponds to the delay interposed by delay link Vtv, or by pulse frame delay *tv*. With the recording of these two coupling point switch addresses a connection is first completed in one transmission direction, i.e. from the receiving time division multiplex line ZMLanI to transmission time multiplex line ZMLabN. However, at the same time, a connection is completed in the other transmission direction, i.e. from the receiving time division multiplex line ZMLanN to transmission time division multiplex line ZMLabI. The same address is recorded for these two connections in circulation store UI with which, over decoder DanI coupling point switch Ik0 is approached. At a later time corresponding to the delay time period *tv* of delay link Vtv, over decoder DabI, coupling point 6kI is approached. Accordingly, with the same address stored in circulation store UN, with which, over decoder DabN, coupling point switch 0kN is approached coupling point switch Nk6 is approached over decoder DanN earlier by delay period *tv*. It then follows that between the point in time of the approaching of coupling point switch Nk6 and the point in time of the approaching of coupling point switch 6kI there lies a time period which equals twice the pulse frame delay time *tv*, and which is just bridged over by the delay link lying in intermediate line Z6. If one assumes, for example, that the pulse frame delay time *tv*, and thereby the individual delay times of the delay links Vtv have the duration of three time slots, and the coupling point switch Ik0 is in each case actuated in the twentieth time slot of the pulse frame determinative for the receiving time division multiplex lines ZMLanI . . . ZMLanN, then in each case in the same time slot which represents in view of the said pulse frame delay time of three time slots the 17th time slot of the pulse frame determinative for the transmission time division multiplex lines ZMLabI . . . ZMLabN, time channel switch 0kN is actuated. In the 17th time slot of the pulse frames, determative for the receiving time division multiplex lines ZMLanI . . . ZMLanN, coupling point switch Nk6 is actuated. As compared to the actuation point in time in each case of the coupling point switch Nk6 delayed by six time slots and thus in each case in the 20th time slot of the pulse frame determinative for the transmission time multiplex lines ZMLabI . . . ZMLabN, coupling point switch 6kI is actuated. Thus, on each transmission path in both transmission directions the same time channel is used within the pulse frame in each case.

In corresponding manner the circuit arrangement according to the invention also operates at smaller time intervals between the time channels to be used on the two transmission paths, so that the connection is to be conducted over different intermediate line pairs not shown in more detail in the drawing. If on both transmission paths in each case the same time channel can be utilized, the connection is finally conducted in a manner of one of the above explained processes over the intermediate line pair Z3/Z3' into which a pair of delay links is inserted. The delay time of these is in each case equal to the pulse frame delay time *tv* of, for example, three time slots.

As can further be seen from the drawing, the address circulation stores UI . . . UN and the decoders DanI . . . DanN, DabI . . . DabN, switched thereafter, can also serve to approach coupling point switches 1kv . . . Nkv, vkI . . . vkN, over which the associated receiving time multiplex line ZMLanI . . . ZMLanN, or transmission time division multiplex line ZMLabI . . . ZMLabN in each case, is connectible to a further intermediate line. These in turn are connectible over first coupling point switches vkV, vkV', . . . or second further coupling point switches V'kv, Vkv, . . . with intermediate line pairs ZV/ZV' which contain pairs of static intermediate stores for temporary information storage for storage times which in each case are greater than twice the pulse frame delay time. The approaching of coupling point switches Ikv . . . Nkv, vkI . . . vkN proceeds in a manner correspond to one of the above explained processes, so that further explanations are not needed here. For the approaching of the said first and second further coupling point switches vkV, vkV' . . . and V'kv, Vkv, . . . there is provided in the circuit arrangement shown in the drawing, a further address circulation store UV, after which is directly connected on the output side a first decoder DanV, and a second decoder DabV is connected over a delay link Vtv, the delay time whereof is again equal to the pulse frame delay time *tv*. The outputs of the first decoder DanV lead to the control inputs of the mentioned first further coupling point switches vkV, vkV' . . . The outputs of the mentioned second decoder DabV lead to the control inputs of the mentioned second further coupling point switches V'kv, Vkv, . . . Thereby, with one and the same address recorded in the adress circulation store UV two coupling point switches of an intermediate line pair are approached, and are displaced in time from one another by the pulse frame delay time, as is shown in the drawing by appropriate markings for the coupling point switches vkV and V'kv. If a connection is conducted over an intermediate line pair containing a pair of static intermediate stores, as, for example, intermediate line pair ZV/ZV', then at first, processes completely corresponding to the above explained processes proceed at the approaching of, for example, coupling point switches Ikv, Nkv, vkI, vkN. Additionally, there are also recorded, at those circulation phases at which in the address circulation stores UI . . . UN the coupling point switching addresses in question in each case are recorded, into the address circulation store UV the addresses of the further coupling point switches in question. Thereby the further coupling point switches are also actuated correctly according to the proper time channel in each case. These processes proceed analogously to the already explained processes, so that further explanations are not needed here.

The invention has been explained with the aid of a description of a preferred embodiment which is based on a pulse frame delay time of a duration of three time slots. Accordingly, a circuit arrangement according to the invention can also be based on different pulse frame delay times, which may be greater or less than three time slots. For a pulse frame delay time equal to zero the delay link switched after an address circulation store output can be eliminated and the second decoder can coincide with the first decoder. It is contemplated that a number of other modifications to or changes in the preferred embodiment, which will be within the scope of the appended claims, will occur to those skilled in the art.

We claim:

1. In a telecommunication exchange circuit means for completing a connection for message signals having a plurality of transmission paths, each path having arriving and departing lines for conducting message signals separately in arriving and departing transmission directions, respectively, wherein when a connection is established, a time channel is assigned in a pulse frame of said arriving line and the next free time channel is assigned to a pulse frame in said departing line so that the same time channel is used in both transmission directions for the pulse frames for each direction, and wherein the pulse frames for said arriving and departing lines are, respectively, synchronized with one another utilizing delay links inserted into said arriving lines, said delay links being dimensioned as to produce a time delay so that the corresponding pulse frames of said departing lines possess time positions different from the time positions of the pulse frames in said arriving lines, said delay time being determined by the desired mean total time interval between assigned time channels, the improvement comprising:

a plurality of differently dimensioned intermediate line pairs in the connection switching matrix for such an exchange station, said line pairs including intermediate stores having storage times complementary to one another, a plurality of first coupling point switches for connecting said arriving lines to said intermediate line pairs, a plurality of second coupling point switches connecting said intermediate line pairs to said departing lines, said arriving and departing lines having corresponding pulse frames being connected via one of said first and one of said second coupling point switches and an associated intermediate line pair to form a transmission path, a plurality of common address storage means, one of which is coupled to and in common with each said transmission path, first decoder means for each transmission path having outputs connected to said first coupling point switches and an input connected to said common address storage means associated therewith, delay means having a delay time corresponding to a pulse frame delay time coupled to the outputs of said first decoder means and second decoder means for each transmission path, each having a plurality of outputs for said second coupling point switches in the transmission path associated therewith, the inputs of said second decoder means being coupled through said delay means to said first decoder means inputs.

2. The circuit means defined in claim 1 wherein said common address storage means are connected to coupling point switches over which one of an arriving and departing transmission lines is connectible in a further connection over a further intermediate line which, in turn, is connected to further intermediate line pairs containing static intermediate stores, and comprising additionally third coupling point switches for accomplishing said further connection, and further address storage means for approaching said third coupling point switches.

* * * * *